Patented Jan. 30, 1951

2,539,914

UNITED STATES PATENT OFFICE 2,539,914

PIGMENT COMPOSITIONS FOR PAD DYEING

Joseph Monroe Kuhn, Haddonfield, N. J., assignor to The Sherwin-Williams Company, Cleveland, Ohio, a company of Ohio No Drawing. Application August 4, 1945, Serial No. 609,036

4 Claims. (Cl. 260—15)

This invention relates to compositions for pad dyeing of textiles wtih insoluble pigments. In pad dyeing there is employed a bath comprising an emulsion of water and a volatile solvent, the latter containing the pigment and a resin binder. One method of pad dyeing is to immerse the textile in the bath and then pass it between squeeze rolls which remove the excess of color and other bath constituents. As an alternate method, one of the squeeze rolls is partially immersed in the color bath, whereby some of the bath is carried to the nip between the partially immersed roll and the roll adjacent to it. In this case the textile is dyed by passing between the rolls without previous immersion in the bath. A method of pad dyeing resin-bound water-insoluble pigments in a water emulsion has been disclosed by Jennings, in Patent 2,334,199.

Although pigmented lacquer-in-water emulsions have been known and recommended for dyeing textiles by the pad dyeing method, a serious drawback has been the difficulty of preparing emulsions which will remain stable over a long period of time, and under those conditions which exist in the pad dyeing process where the textile and the emulsion are continuously squeezed between two or more tightly set squeeze rolls.

As a novel feature of my emulsion, two or more binders are used in dispersed form in the lacquer phase of the emulsion. They are of such a nature that they are each separately soluble in the organic solvent employed, but they are mutually incompatible in said solvent. Such a lacquer phase is readliy emulsifiable to form a lacquer-in-water emulsion which will remain stable under the most severe conditions of pad dyeing. The cloth after soaping and finishing, possesses an excellent hand, and the color has excellent fastness to laundering, dry cleaning, crocking, and light.

The binders preferably employed are ethyl cellulose and an organic solvent-soluble resin such as urea formaldehyde. These two types of binders are soluble in certain organic solvents, but are mutually incompatible when the proportions are 1 part up to 4 parts by weight of the ethyl cellulose to 4 parts by weight of the organic solvent-soluble urea formaldehyde or melamine formaldehyde resin.

The washfastness is impaired if there be more than 1 part of ethyl cellulose to 1 part of resin.

The emulsion as marketed may have a non-aqueous phase greater than 50%, but when used for pad dyeing, is greatly diluted with water. As the ethyl cellulose and the urea or melamine formalehdyde are incompatible in the organic solvent, it is possible to reduce greatly the amount of organic solvent and thereby reduce the cost and the fire hazard. Various different types of volatile organic solvents may be employed, and the solvent should be present in such an amount that there are not more than 180 parts by weight of the solvent to 100 parts by weight of the binders.

The amount of pigment in respect to the amount of resin will vary with the character of the pigment and the depth of color desired. The volatile organic solvents used are those which are immiscible with water, and which are active solvents of the ethyl cellulose and resin used.

The following are a few of the many emulsions which may be made within the scope of my invention:

*Example 1.*—One part is made by flushing 454 grams of Monastral Blue presscake (100 grams dry pigment) with 163 grams of Melmac 245–8. 294 grams of water are separated and removed as a result of the flushing.

A second part is made by mixing 157 grams of Melmac 245–8, 330 grams of Sovasol 5A, and 150 grams of Ethocel 10 cp. Standard ethoxy, until the ethyl cellulose is dissolved. A cloudy thick liquid is produced.

The two parts so produced are then mixed together and roller milled until the product has a smooth consistency.

Monastral Blue constitutes the pigment, and is a phthalocyanine. Various other insoluble pigments may be employed. Melmac 245–8 contains 50 parts of melamine formaldehyde resin, 30 parts of butyl alcohol, and 20 parts of xylene. The resin alone might be used, or other resins such as urea formaldehyde might be used. Sovasol 5A is a petroleum hydrocarbon having a boiling range of 154 to 194° C., and a Kauri-Butanol value of 67. Ethocel is an ethyl cellulose, and that used has a viscosity of 10 centipoises. The two binders, ethyl cellulose and melamine formaldehyde, are each soluble in the organic solvent, but are incompatible in the solvent.

The paste above described may be manufactured and shipped to the point of use, and may be then readily emulsified in water by first mixing into the paste a solvent-soluble emulsifying agent of the anionic type, such as triethanolamine oleate, or of the nonionic type, such as Igepal CA extra concentrated, which is an ethylene oxide fatty acid condensation product, Triton X-100, which is a high molecular weight alcohol, or Tween, which is a polyoxyalkalene derivative of a sorbitan laurate, palmitate, stearate or oleate.

1 part of emulsifier to 4 or 5 parts of paste is sufficient to produce a readily emulsified pigmented paste containing 1 part of ethyl cellulose for each 4 parts or less of the incompatible heat curing solvent-soluble resin, such as melamine formaldehyde.

*Example 2.*—The materials employed, with brief indication as to the steps, are as follows:

233 grams Permansa Green presscake (100 grams dry pigment)
100 grams water

Mix to smooth paste and add 175 grams Melmac 245-8

Mix and flush off 80 grams of water. Add 25 grams Melmac 245-8 and
297 grams turpentine
___
830 grams Mill through colloid mill.

Then there are mixed:

530 grams of paste, prepared as above
35 grams oleic acid
143 grams Melmac 245-8
143 grams 25% Ethocel solution 10 cp. Standard
35 grams octyl alcohol
114 grams 65% Aerosol OT in butyl Cellosolve.

The Permansa Green presscake is a green iron salt of nitrosobetanaphthol. Aerosol OT is a dioctyl sodium succinate, and butyl Cellosolve is a monobutyl ether of ethylene glycol.

Neither the oleic acid nor the octyl alcohol is essential. The turpentine is present as a solvent for the melamine formaldehyde resin. Other pigments and other solvents may be employed.

*Example 3.*—The materials employed, with brief indication as to the steps, are as follows:

615 grams Monastral Blue presscake (120 grams dry pigment)
196 grams Melmac 245-8.

Flush and remove 423 grams water, then add 284 grams Melmac 245-8 ⎫
264 grams Sovasol 5A    ⎬ Mix until Ethocel is dissolved.
120 grams Ethocel 10 cp. Std. ⎭
___
1479 grams Run through paste colloid mill.

Then there are mixed:

1104 grams of pigment paste prepared as above
300 grams soap (1 part triethanolamine + 2 parts oleic acid)
120 grams Melmac 245-8 ⎫
132 Sovasol 5A        ⎬ Mixed until the Ethocel is dissolved.
60 grams Ethocell 10 cp. Std ⎭
___
1716

In the foregoing examples the ratios of the pigment to the binder solids (ethyl cellulose and melamine formaldehyde) and the ratios of the pigment to each of these binder solids are as follows:

In Example 1 the ratio of pigment to ethyl cellulose is 1 to 1.5, to melamine formaldehyde is 1 to 1.6, and to the two binder solids is 1 to 3.1.

In Example 2 the ratio of pigment to ethyl cellulose is 1 to 0.5, to melamine formaldehyde is 1 to 2.02, and to the two binder solids is 1 to 2.52.

In Example 3 the ratio of pigment to ethyl cellulose is 1 to 1.5, to melamine formaldehyde is 1 to 2.5, and to the two binder solids is 1 to 4.

The ratio of ethyl cellulose to resin is 1 to 1.06 in Example 1, 1 to 4 in Example 2, and 1 to 1.7 in Example 3.

As previously noted, the ratio of pigment to resin may vary with the character of pigment and the extent of the desired coloration.

By following these examples there is produced a paste which can be emulsified in water merely by the gradual addition of water while stirring. The emulsion is very stable, and may be padded on cotton cloth prepared by dyeing, dried, and cured for 1 minute at 375° F.

Having thus described my invention what I claim as new and desire to secure by Letters Patent is:

1. A pigment composition as defined in claim 4 and in which the resin is melamine formaldehyde.

2. A pigment composition as defined in claim 4 and in which the resin is urea formaldehyde.

3. A pigment composition of the lacquer-in-water type for pad dyeing, and having in the lacquer phase a binder comprising ethyl cellulose and a resin selected from the group consisting of urea formaldehyde and melamine formaldehyde, and a volatile organic solvent which is immiscible with the water and in which ethyl cellulose and the resin are incompatible, the ratio of said ethyl cellulose to said resin being between 1 to 1.06 and 1 to 4, and the solvent being at least 100 parts and not over 180 parts to 100 parts of binder, and a pigment dispersed in said resin and insoluble in said solvent.

4. A pigment composition of the lacquer-in-water type for pad dyeing, and having in the lacquer phase a volatile organic solvent immiscible with water, a pigment, a binder comprising ethyl cellulose and a resin selected from the group consisting of urea formaldehyde and melamine formaldehyde, and in which the ratio of ethyl cellulose to resin in the solution is 1 to between 1.06 and 4.

JOSEPH MONROE KUHN.

REFERENCES CITED

The following references are of record in the file of this patent:

UNITED STATES PATENTS

| Number | Name | Date |
|---|---|---|
| 2,342,641 | Cassel | Feb. 29, 1944 |
| 2,364,692 | Cassel | Dec. 12, 1944 |